April 5, 1960  E. LAXO  2,931,415
MACHINE FOR NECKING-IN, FLANGING AND BEADING PAIL BODIES
Filed Nov. 26, 1956  7 Sheets-Sheet 1

INVENTOR.
ED LAXO
BY Edward B. Gregg
ATTORNEY

April 5, 1960            E. LAXO            2,931,415

MACHINE FOR NECKING-IN, FLANGING AND BEADING PAIL BODIES

Filed Nov. 26, 1956            7 Sheets-Sheet 2

INVENTOR.
ED LAXO
BY
ATTORNEY.

April 5, 1960               E. LAXO               2,931,415

MACHINE FOR NECKING-IN, FLANGING AND BEADING PAIL BODIES

Filed Nov. 26, 1956               7 Sheets-Sheet 3

INVENTOR.
ED LAXO

BY *Edward B. Fry*

ATTORNEY

April 5, 1960 E. LAXO 2,931,415
MACHINE FOR NECKING-IN, FLANGING AND BEADING PAIL BODIES
Filed Nov. 26, 1956 7 Sheets-Sheet 4

INVENTOR.
ED LAXO
BY
ATTORNEY

April 5, 1960     E. LAXO     2,931,415
MACHINE FOR NECKING-IN, FLANGING AND BEADING PAIL BODIES
Filed Nov. 26, 1956     7 Sheets—Sheet 5

INVENTOR.
ED LAXO
BY *Edward B. Fry*
ATTORNEY

April 5, 1960 E. LAXO 2,931,415
MACHINE FOR NECKING-IN, FLANGING AND BEADING PAIL BODIES
Filed Nov. 26, 1956 7 Sheets-Sheet 6

INVENTOR.
ED LAXO
BY Edward B. Legg
ATTORNEY

April 5, 1960 E. LAXO 2,931,415
MACHINE FOR NECKING-IN, FLANGING AND BEADING PAIL BODIES
Filed Nov. 26, 1956 7 Sheets-Sheet 7

INVENTOR.
ED LAXO
BY
ATTORNEY

United States Patent Office 2,931,415
Patented Apr. 5, 1960

2,931,415

MACHINE FOR NECKING-IN, FLANGING AND BEADING PAIL BODIES

Ed Laxo, Oakland, Calif.

Application November 26, 1956, Serial No. 624,235

1 Claim. (Cl. 153—2)

This invention relates to a machine for performing certain operations on sheet metal containers of tubular shape. More particularly, this invention relates to a machine for performing the so-called necking-in, flanging and beading operations on sheet metal pail bodies.

Sheet metal pails, for example, those of five gallon capacity used to hold paint, grease and the like, are employed in very large quantities. Their manufacture presents certain problems. Because of the large size of the containers and the heavy gauge of the steel employed to make them, such containers have been made heretofore by relatively inefficient methods and/or slow methods. Also, difficulty has been encountered in achieving precision at high speed.

More particularly, in the manufacture of five gallon pails of the character described, it is necessary, once the tubular pail body has been formed, to form a flange and neck at the lower end and a bead and curl at the upper end. The flange at the lower end is joined to a pail bottom by an end seam. The so-called "necking-in" operation forms this flange and it also gives the lower end a smaller diameter such that it will nest on top of another pail. The bead at the upper end serves as a reinforcement, and the curl at the upper end is intended to receive the lugs of a cover.

It will be apparent that several operations are required to form a pail body in this manner. To perform these operations at high speed and with a high degree of precision is difficult.

Heretofore, a separate machine has been required for each operation; i.e., a machine for the flanging and necking-in operation; a separate machine for the beading operation and yet another machine for the curling operation.

Heretofore, to my knowledge, no single machine has been available capable of performing all of these multiple operations on pail bodies, automatically at high speed and with precision.

It is an object of the present invention to provide an improved machine of the character and for the purpose described.

Another object of the invention is to provide a pail making machine which is adapted to perform several operation on pail bodies, such as those described hereinabove, in a series of steps which are carried on continuously.

A further object is to provide a machine which will perform the necking-in, end curling and beading operations on large pail bodies, such as the present-day, standard five gallon pail having a lug cover, and which will operate at high speed and with precision.

These and other objects of the invention will be apparent from the ensuing description and the appended claim.

One form of the invention is illustrated by way of example in the accompanying drawings, in which Figure 1 is a view in front elevation of the machine of the invention, with certain parts broken away to reveal interior construction.

Figure 1:
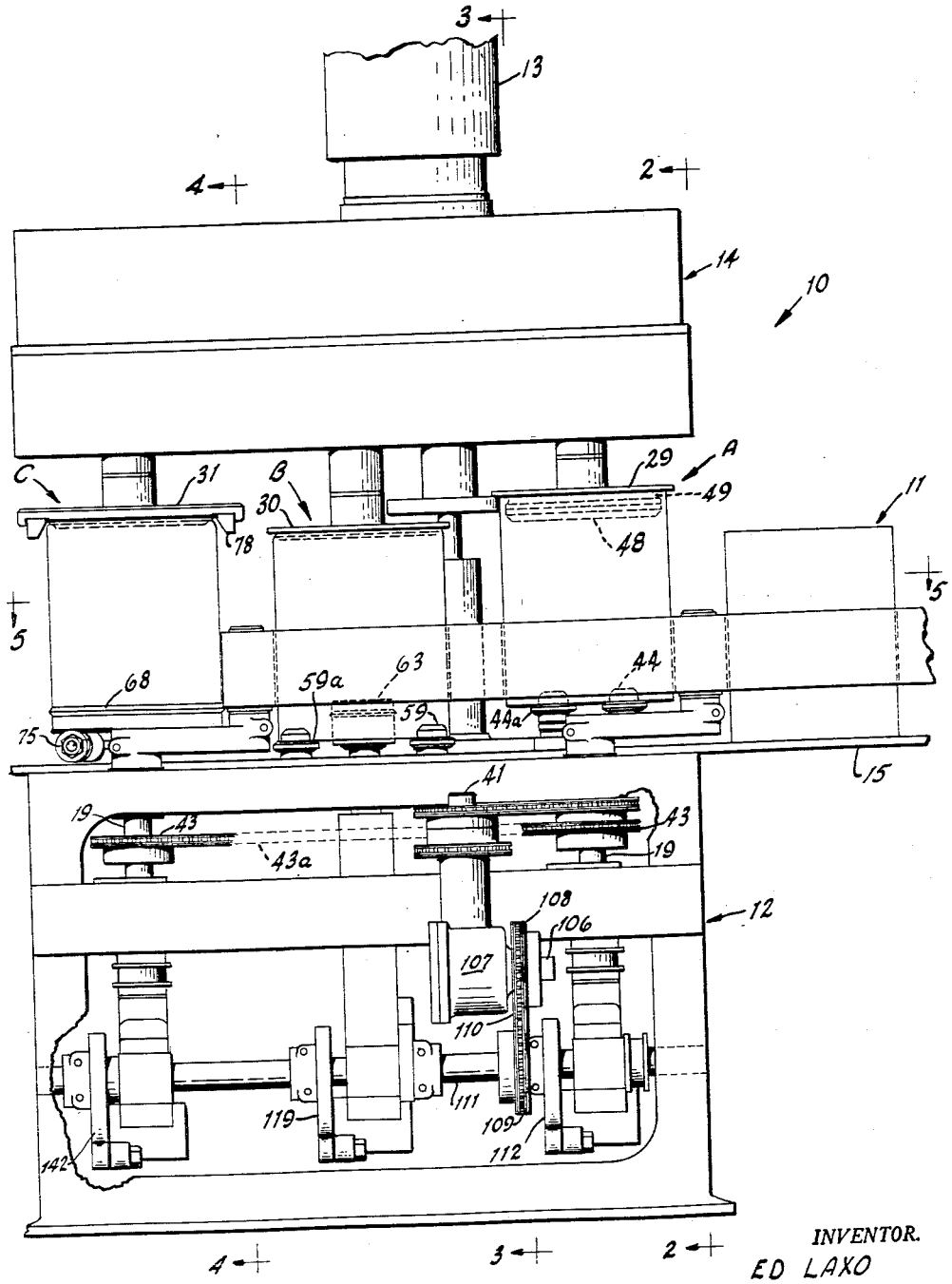

Referring now to the drawings, and more particularly to Figure 1, the machine is generally designated by the reference numeral 10. It is intended to operate upon tubular, sheet metal pail bodies, one of which is shown at 11 in Figure 1 in the form received by the machine. The machine has three stations, indicated as A, B and C, for performing the first, second and third operations, respectively, as described in detail hereinafter.

The machine comprises a frame 12 and motive means in the form of an electric motor 13, which is suitably connected with the moving, operating parts of the machine through a transmission generally designated with reference numeral 14. A horizontal feed table 15 is provided upon which the pails 11 are supported as they move from station to station, such table being formed with openings at 15a (see Figure 5) for passage of lifter rollers and curling rolls.

Figure 2:
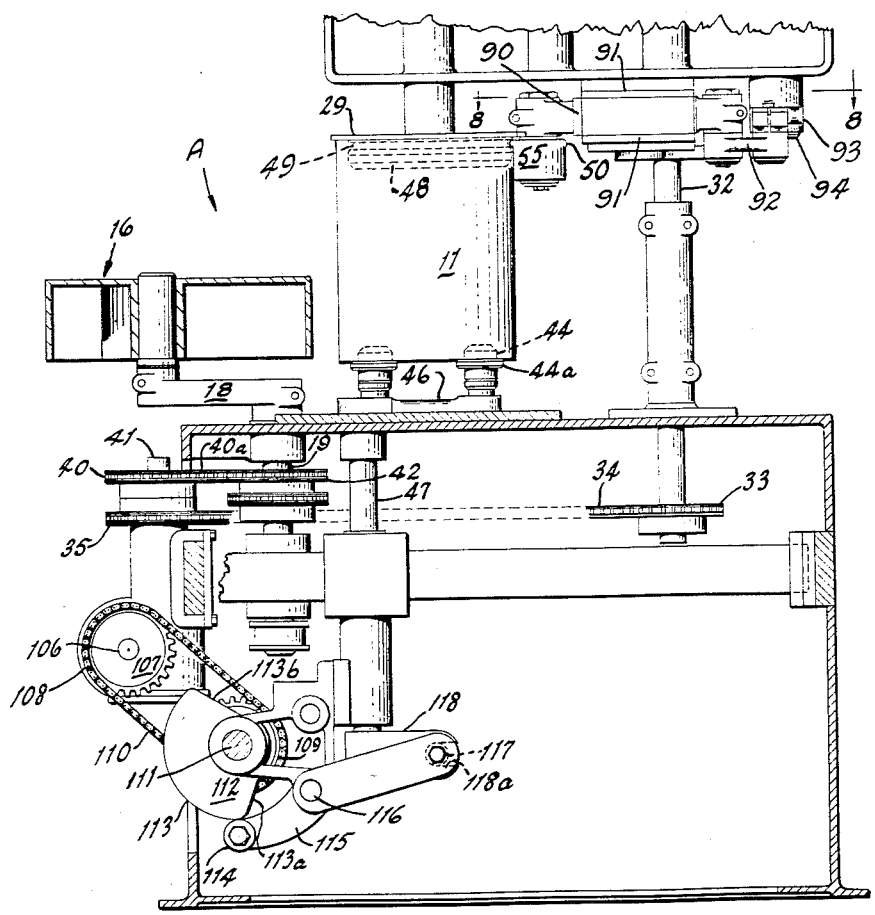
Figure 2 is a section taken along the line 2—2 of Figure 1, illustrating the first operation or necking-in station of the machine.
Figure 5:
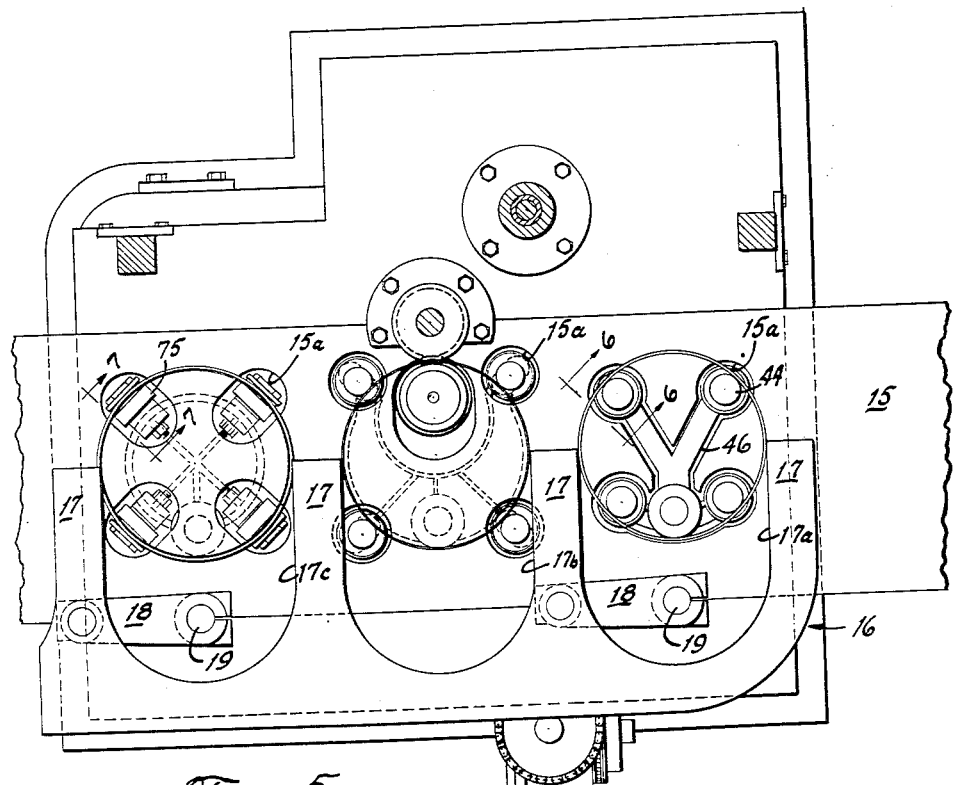
Figure 5 is a section taken along the line 5—5 of Figure 1 showing the feed table, the feed fork, the lifter rollers and the curling rolls in top plan view.
Figure 6:
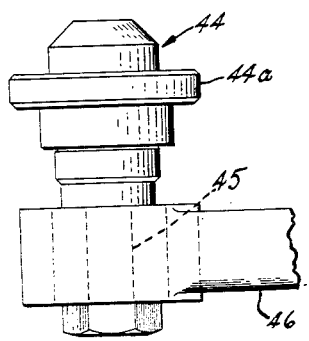
Figure 6 is a fragmentary sectional view taken along the line 6—6 of Figure 5, showing one of the lifter rollers at the first operation station in side elevation and on a larger scale than in Figure 5.

Referring now more particularly to Figures 2 and 5, a pail feed member or feed fork is provided which is generally designated by the reference numeral 16. It is a fork-like member having four arms or prongs 17 which are spaced apart to provide three U-shaped pail holding sockets 17a, 17b and 17c. The feed fork 16 is supported by a pair of horizontal cranks 18, each of which is fixed to a shaft 19 suitably journaled in the frame of the machine and driven in the manner indicated hereinafter.

Figure 4:
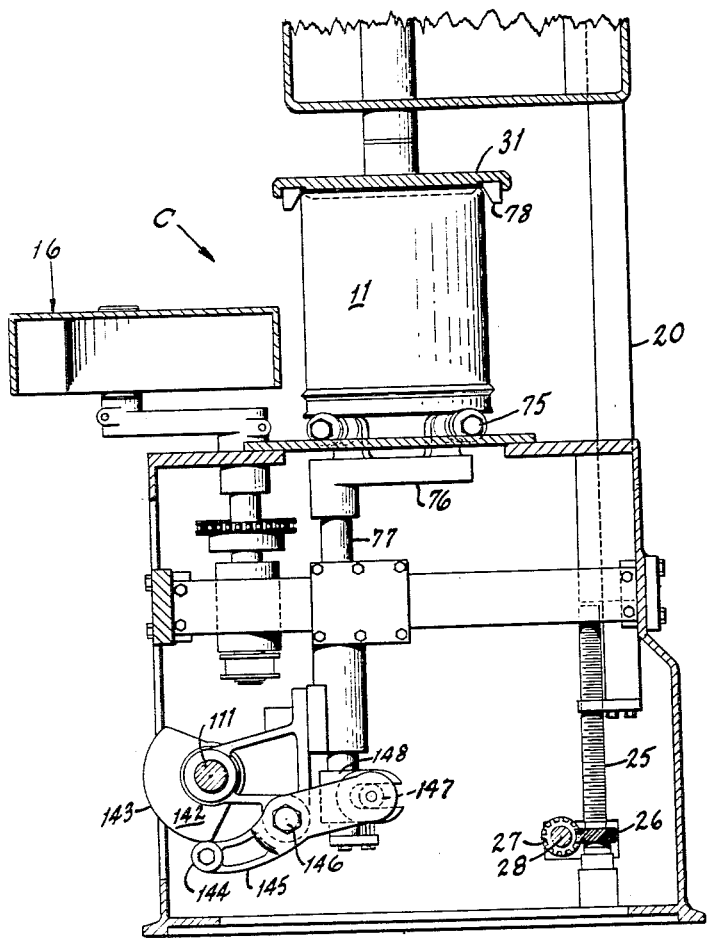
Figure 4 is a section taken along the line 4—4 of Figure 1, illustrating the third operation or end curling station of the machine.

Referring now more particularly to Figure 4, it will be seen that the transmission 14 is adjustably supported by posts, one of which is shown at 20. The lower ends of the posts 20 are threaded to screws 25. Fixed to the lower end of each of the screws 25 is a gear 26 which meshes with a gear 27 fixed to a shaft 28. It will be apparent that, by rotating the shaft 28, the posts 20 and with them the transmission 14 can be moved up and down. The purpose of this vertical adjustment is to enable vertical adjustment of chucks 29, 30 and 31 (see Figure 1) for pails of different heights. Two of the chucks (29 and 31) are continuously rotated by the motor 13 and transmission 14 during operation of the machine and are maintained in fixed position except for the vertical adjustment described. The chuck 30 is an idler chuck.

Referring now more particularly to Figure 2, the transmission 14 is connected by a shaft 32 to a sprocket 33 which is connected by a chain 34 to a sprocket 35, which in turn drives a sprocket 40 fixed to a shaft 41. The sprocket 40 is connected by a chain 40a to a sprocket 42, which is fixed to one of the two shafts 19 which carry the feed fork 16. As shown in Figure 1, sprockets 43 and a chain 43a serve to rotate the other shaft 19.

It will be apparent that, during each cycle of operation, the feed fork 16 will undergo a rotative cycle of movement commencing at the position shown in Figure 1, then proceeding to the position shown in Figure 5, and then returning to the position shown in Figure 1. In its travel from the position shown in Figure 1 to that shown in Figure 5, it will transfer a new, unformed pail body such as that shown at 11 at the extreme right in Figure 1, to a position of registry with the chuck 29 at the first operation station A. Each of the pail bodies to the left (as viewed in Figure 1), will be transferred one position to the left; i.e., the pail body previously at station A will be transferred to station B, that previously at station B will be transferred to station C, and that previously at station C will be ejected from the machine as a completely formed pail body. Pail bodies will be supplied to the machine by any suitable means, such that a new pail body is always in position on the right-hand extension of feed table 15 when the feed fork 16 returns to the position shown in Figure 1.

Referring now to Figures 1, 2, 5 and 6, at station A the pail body 11 is lifted by four lifter rollers 44. Each of these rollers has a flange 44a and is rotatable on a pin 45 which is clamped to the outer end of an arm of a spider 46. The spider 46 is fixed to a lifter shaft 47 which is slideably mounted. The manner in which the lifter shaft 47 is operated and timed will be explained hereinafter. As shown in Figures 1 and 2, the pail body 11 seats upon the flanges 44a of the lifter rollers 44 and it will be apparent that, when the lifter shaft 47 moves upwardly the flanges 44a will lift the pail body 11 and will engage it with the chuck 29. It will also be apparent from Figures 1 and 2 that a necking-in die 48 is provided which is fixed coaxially to the chuck 29 but is of smaller diameter to fit within the pail body. At this point it should be explained that, for convenience and efficiency of operation, the pail bodies are inverted. That is, the upper ends become the bottoms of finished pails, and vice versa.

Figure 9:
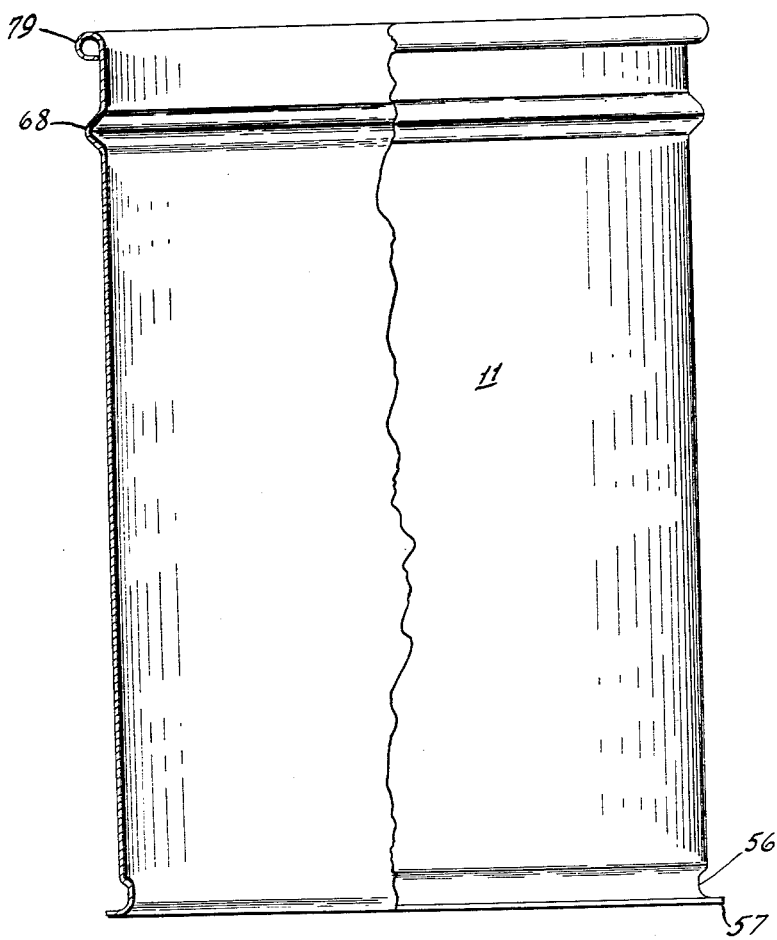
Figure 9 is a view partly in section and partly in side elevation of a pail body such as is formed by the machine of the invention.

The necking-in die 48 is formed with an annular groove 49 which is intended to mate with annular ribs 50 of necking-in rolls 55. The necking-in operation results in the formation of an annular groove or neck 56 and flange 57 (see Figure 9). It is the function of the flange 57 to form a seam with a bottom cover. The neck 56 shrinks the diameter sufficiently that the bottom of one pail will nest in the top of another pail.

Figure 3:
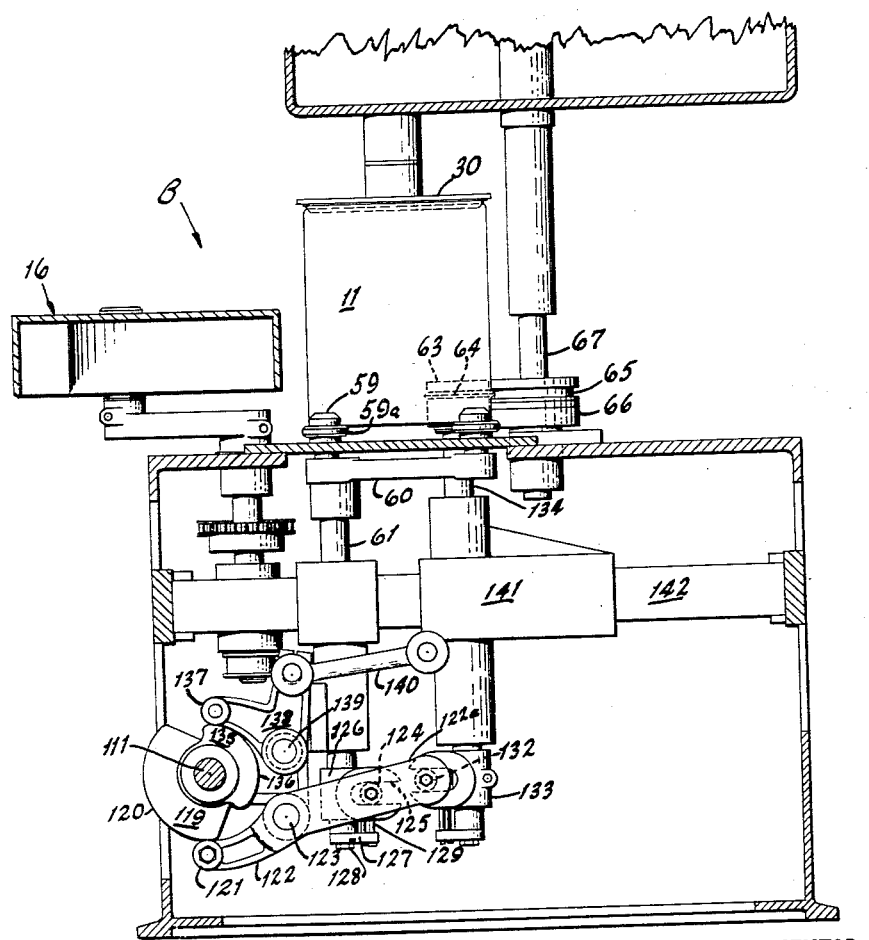
Figure 3 is a section taken along the line 3—3 of Figure 1, illustrating the second operation or beading station of the machine.

Referring now more particularly to Figures 1 and 3, at station B lifter rollers 59 are provided which are similar to the rollers 44 at station A. They are similarly formed with flanges 59a and are rotatably mounted on a spider 60 which is carried by a lifter shaft 61 which is vertically slideable. It will be noted that the lifter rollers 59 at station B are located outwardly rather than inwardly of the pail body 11 (as at station A). The reason for such location will be apparent from the description hereinafter. An inside beading roll 63 is provided which is mounted and operated in the manner hereinafter described and which is formed with an annular beading rib 64 which is intended to cooperate with an annular beading groove 65 formed in an outside beading roll 66 which is mounted on the lower end of a continuously driven shaft 67. It is intended that the beading rolls 63 and 66 form a bead on the pail body 11, such as shown at 68 in Figures 1 and 9. In operation, when the lifter shaft 61 rises the flanges 59a of the lifter rollers 59 lift the pail body 11 upwardly until it bears against the chuck 30. The inside beading roll 63 is shifted outwardly, or to the right as viewed in Figure 3, by the means and in the manner described hereinafter, thereby exerting a pressure on the inside of the pail body in registry with the groove 65 of the outside beading roll 66. Meanwhile the pail will be caused to rotate by the outside beading roll 66. Accordingly, it will be apparent that a reinforcement bead will be formed such as shown at 68 in Figures 1 and 9.

Figure 7:
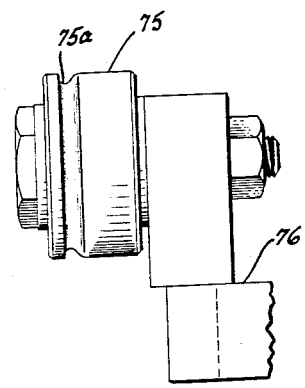
Figure 7 is a fragmentary, sectional view taken along the line 7—7 of Figure 5, showing one of the curling rollers in side elevation and on a larger scale than in Figure 5.

Referring now more particularly to Figures 4, 5 and 7, at station C a plurality of curling rolls 75 are provided each of which is formed with an annular curling groove 75a and is rotatably mounted on a spider 76. The spider 76 is carried by a lifter shaft 77. It will be seen that the driving chuck 31 is provided with wedge shaped members 78, the purpose of which is to wedge against the metal of the pail body 11 to prevent it from slipping relatively to the chuck.

In operation, when the lifter shaft 77 is raised it lifts the curling rolls and the bottom edge of the pail body 11 seats in the grooves 75a. The pail body is lifted up against the chuck 31 and into wedging engagement with the wedge members 78. The rotating chuck 31 spins the pail body and the pressure of the rollers 75 roll the bottom edge of the pail body and forms an end curl 79 (see Figure 9).

Figure 8:
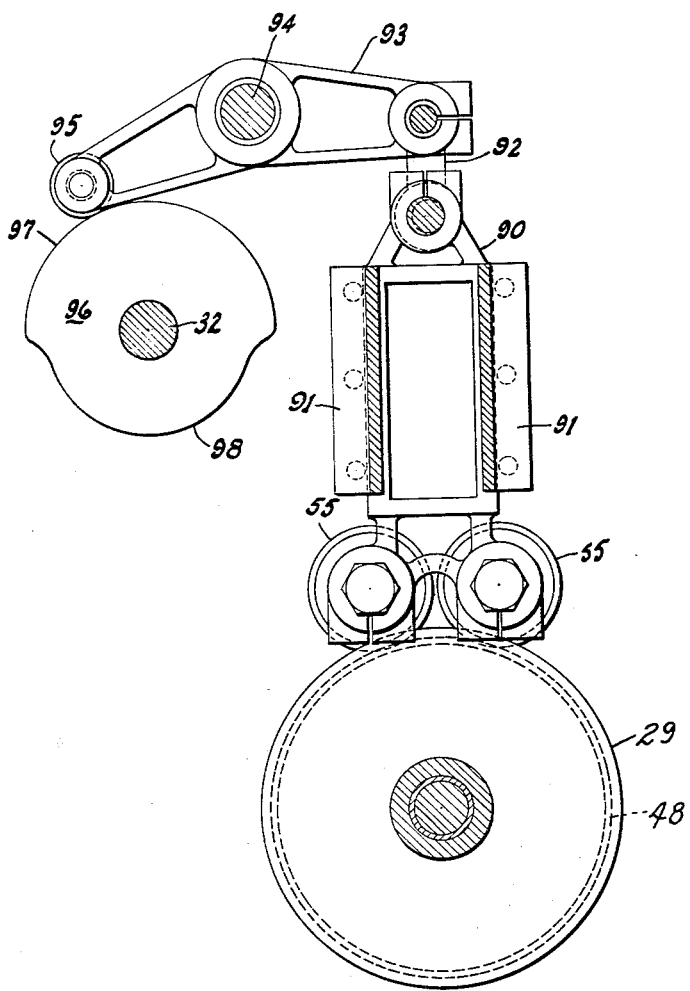
Figure 8 is a section taken along the line 8—8 of Figure 2, but on a larger scale, showing the first operation necking-in cam in top plan view. The pail body shown in Figure 2 is omitted from this view.

Referring now to Figures 2 and 8, as stated above it is the pressure of the necking-in rolls 55 which perform the necking-in operation in cooperation with the die 48. The rolls 55 are shown in top plan view in Figure 8. As will be seen, they are rotatably mounted at one end of a slide member 90 which is slideable in gibs 91 which are fixed to the frame of the machine. The other end of the slide member 90 is connected by a link 92 to one end of a lever 93 which pivots on a shaft 94. At its other end the lever 90 carries a cam follower roller 95 which engages a cam 96 which is fixed to the shaft 32. As will be seen, the cam 96 has a high dwell 97, a low dwell 98 and a corresponding rise and recede. The rise of cam 96 causes the necking-in rolls 55 to move inwardly toward the pail body 11 at station A, that is, to move from right to left as viewed in Figures 2 and 8, and the rolls are held in such position by the high dwell 97. Thereafter the necking-in rolls 55 are withdrawn by the cam 96 to release the pail body and permit it to be lowered and transferred to station B.

Referring now to Figures 1 and 2, the lifter rollers 44 at the station A are operated by the lifter shaft 47, as explained hereinabove. The means by which the lifter shaft 47 and other lifter shafts are operated will now be described.

It will be seen that the shaft 41 is connected to a shaft 106 through gearing at 107. The shaft 106 is connected by sprockets 108 and 109 and a chain 110 to a cam shaft 111. The cam shaft 111 carries a lifter cam 112 having a high dwell 113 and a corresponding rise 113a and recede 113b. A cam follower roller 114 is in contact with the cam 112 and is rotatably mounted at one end of a lever 115 which is pivoted at 116 and whose other end is provided with a roller 117 which is rotatably mounted in the forked end 118a of a bracket 118. The bracket 118 is clamped to the lower end of the lifter shaft 47. Adjustment means are provided which are not shown in Figure 2 but which are identical with adjustment means on the lifter shaft 61 at station B (see Figure 3) described hereinafter. The purpose of such adjustment means is to determine the relation of the lifter shaft 47 and the lever 115.

It will be apparent that the cam shaft 111 rotates continuously and that the cam 112 will, therefore, oscillate the lifter shaft 47. Each time the lifter shaft 47 moves upwardly it will lift the lifter rolls 44 and with them it will lift a pail body 11 to engage it with the driving chuck 29. Fine adjustment is accomplished by the adjustment means referred to above, for adjusting the relative position of the lifter shaft 47 and the lever 115. Thus the lifted pail body is engaged with sufficient but not excessive pressure to the chuck 29 which spins the pail. The cam 96 (see Figure 8) causes the necking-in rolls 55 to move inwardly toward the pail body. The necking-in operation is thereby accomplished, the high dwells of the cams 96 and 112 being sufficient for this purpose.

Referring now to Figures 1 and 3, it will be seen that the cam shaft 111 carries a second lifter cam 119 which is similar to the first lifter cam 112 in that it is intended to operate the second lifter shaft 61 which raises and lowers the lifter rollers 59 at the second operation station or station B. Thus, the cam 119 has a high dwell 120 which acts against a roller 121 rotatably mounted at one end of a lever 122 which is pivoted at 123. The other end of the lever carries a roller 124 which is rotatable in the forked end 125 of a bracket 126. The bracket 126 is clamped to the lower end of the lifter shaft 61. Vertical adjustment means are provided in the form of a plate 127 clamped by a cap screw 128 to the bottom of shaft 61, and a set screw 129 threaded through the plate 127 and bearing against the bottom of the bracket 126. By loosening the bracket 126 and turning the set screw 129, the position of the bracket 126 can be adjusted. When adjustment is made, the bracket is clamped to the shaft 61.

The lever 122 has an extension 122a which carries a roller 132 which is rotatable in the forked end of a bracket 133 which is fixed to the lower end of a lifter shaft 134. The bracket 133 is adjustably clamped to the lower end of the lifter shaft 134 in the same manner that the bracket 126 is clamped to the lower end of its lifter shaft 61.

The cam shaft 111 also carries a shifter cam 135 having a high dwell 136 which acts against a roller 137 rotatably mounted at one end of a bell crank lever 138 which is pivoted at 139. The other arm of the bell crank lever 138 is connected by a link 140 to a slide member 141 which slides on a horizontal stationary member 142 which is fixed to the frame of the machine. The slide member 141 carries the lifter shaft 134, allowing vertical movement thereof.

It will be apparent that as the cam shaft 111 rotates its lifter cam 119 will act to raise the lifter shafts 61 and 134 from their lower positions to the elevated positions illustrated in Figures 1 and 3. The lifter rolls 59 will, therefore, lift the pail body into engagement with the chuck 30 at station B. The inside beading roll 63 is also lifted to register with the outside beading roll 66. The brackets 126 and 133 will have been adjusted so that the pail body 11 is properly engaged with its chuck 30 and the beading rib 64 on the inside beading roll 63 will register with the beading groove 65 on the outside beading roll 66. The shifter cam 135 will act to shift the inside beading roll 63 laterally and to the right as viewed in Figure 3 so as to bring its beading rib against the metal of the pail body. A bead is formed such as shown at 68 in Figures 1 and 9.

Referring now to Figures 1 and 4, the cam shaft 111 also carries a lifter cam 142 having a high portion 143 which acts against a roller 144 rotatably mounted at one end of a lever 145 which is pivoted at 146. The other end of the lever 146 carries a roller 147 which is rotatable in the forked end of a bracket 148. The bracket 148, like the brackets 118, 126 and 133, is adjustably mounted at the lower end of its lifter shaft, which is shown at 77.

In operation the cam 142 acts to raise the lifter shaft 77 and with it the curling rolls 75. The lower edge of the pail body 11 is carried by the grooves 75a of the lifter rolls 75. The high portion 143 of the cam 142 has a gradual rise so that a gradually increasing pressure is applied by the rolls 75 to the bottom edge of the pail 11. In this manner a curl is formed as shown at 79 in Figure 9.

It will, therefore, be apparent that a machine has been provided which is effective for the purpose stated. Thus it is capable of receiving large metal container bodies, such as five gallon pail bodies, in rapid succession and of performing a sequence of operations on such bodies including a necking-in operation, a beading operation and an end curling operation. The machine is capable of high speed operation; it performs the intended operations with precision; and it is capable of fine adjustments.

I claim:

A pail forming machine for executing a necking-in operation on a sheet metal cylindrical pail body such as five gallon pail bodies, said machine comprising: a feed table having a work station and an opening at said station and automatic feed means for supplying pail bodies in sequence and in upright position to said station and for removing said bodies in sequence after completion of each forming operation; a plurality of rollers in registry with said opening and means supporting said rollers to permit rotation of each, to permit vertical reciprocating movement of said rollers in unison through said opening between a lowered position beneath said table and an elevated position above said table, said rollers being spaced apart about a central vertical axis, serving when elevated to support and elevate a pail body at the work station and contacting only a small portion of the lower rim of such pail body; a rotatable chuck located above said table in registry with said rollers and having a diameter greater than the diameter of the upper end of said pail bodies and located at such a height that it will clear a pail body resting on the work table at said work station but will contact the upper rim of a pail body at said work station when the pail body is elevated by said rollers, whereby said chuck and said rollers are enabled to cooperate by engaging the upper and lower ends, respectively, of a pail body and to clamp such pail body in fixed, elevated position while allowing it to rotate about its vertical longitudinal axis; means for so rotating the elevated pail body; means for performing said necking-in operation comprising an inside die of smaller diameter than the smallest inside diameter of the necked-in-pail body, said die being fixed concentrically to said chuck, a pair of rotatable outside dies arranged side-by-side and in registry with the inside die, said outside dies being shiftable laterally, and means for shifting said outside dies to engage an elevated pail body and to cooperate with the inside die to form an annular neck in the pail body and then separate from a necked-in pail body to release the same; and means for imparting to the machine a repetitive cycle of operation wherein a pail body in upright position is moved along the feed table to the work station, the rollers are then elevated through said opening to contact the lower end of the pail body and elevate the same and to cooperate with the chuck to clamp the pail body, the clamped, elevated pail body is rotated, the outside dies are shifted to engage the clamped, rotating pail body, the necking-in operation is executed on the clamped, rotating pail body, the outside dies are then shifted away from the necked-in pail body to release the same, the rollers are then lowered through said opening and the pail body is removed from the work station.

References Cited in the file of this patent

UNITED STATES PATENTS

| | | |
|---|---|---|
| 324,318 | Hart | Aug. 11, 1885 |
| 753,966 | Eustice | Mar. 8, 1904 |
| 900,119 | Odquist | Oct. 6, 1908 |
| 928,618 | Wilzin | July 20, 1909 |
| 1,307,888 | Warme | June 24, 1919 |
| 1,327,994 | Gray | Jan. 13, 1920 |
| 1,412,232 | Eichman | Apr. 11, 1922 |
| 1,615,325 | Cameron | Jan. 25, 1927 |
| 1,753,963 | Mauser | Apr. 8, 1930 |
| 1,804,815 | Schultis | May 12, 1931 |
| 1,807,980 | Grotnes | June 2, 1931 |
| 1,810,342 | Bulger | June 16, 1931 |

(Other references on following page)

UNITED STATES PATENTS

| | | |
|---|---|---|
| 2,295,852 | Le Jeune | Sept. 15, 1942 |
| 2,312,225 | Wilkinson | Feb. 23, 1943 |
| 2,421,450 | Barrie | June 3, 1947 |
| 2,432,658 | Coyle | Dec. 16, 1947 |
| 2,567,334 | Harrison | Sept. 11, 1951 |
| 2,740,451 | Knost | Apr. 3, 1956 |
| 2,822,022 | Calcaterra | Feb. 4, 1958 |

FOREIGN PATENTS

| | | |
|---|---|---|
| 20,905 | Great Britain | Sept. 11, 1897 |
| 14,679 | Great Britain | July 1, 1902 |